E. RUSSELL.
CAR-COUPLING.
No. 7,082. Reissued April 25, 1876.
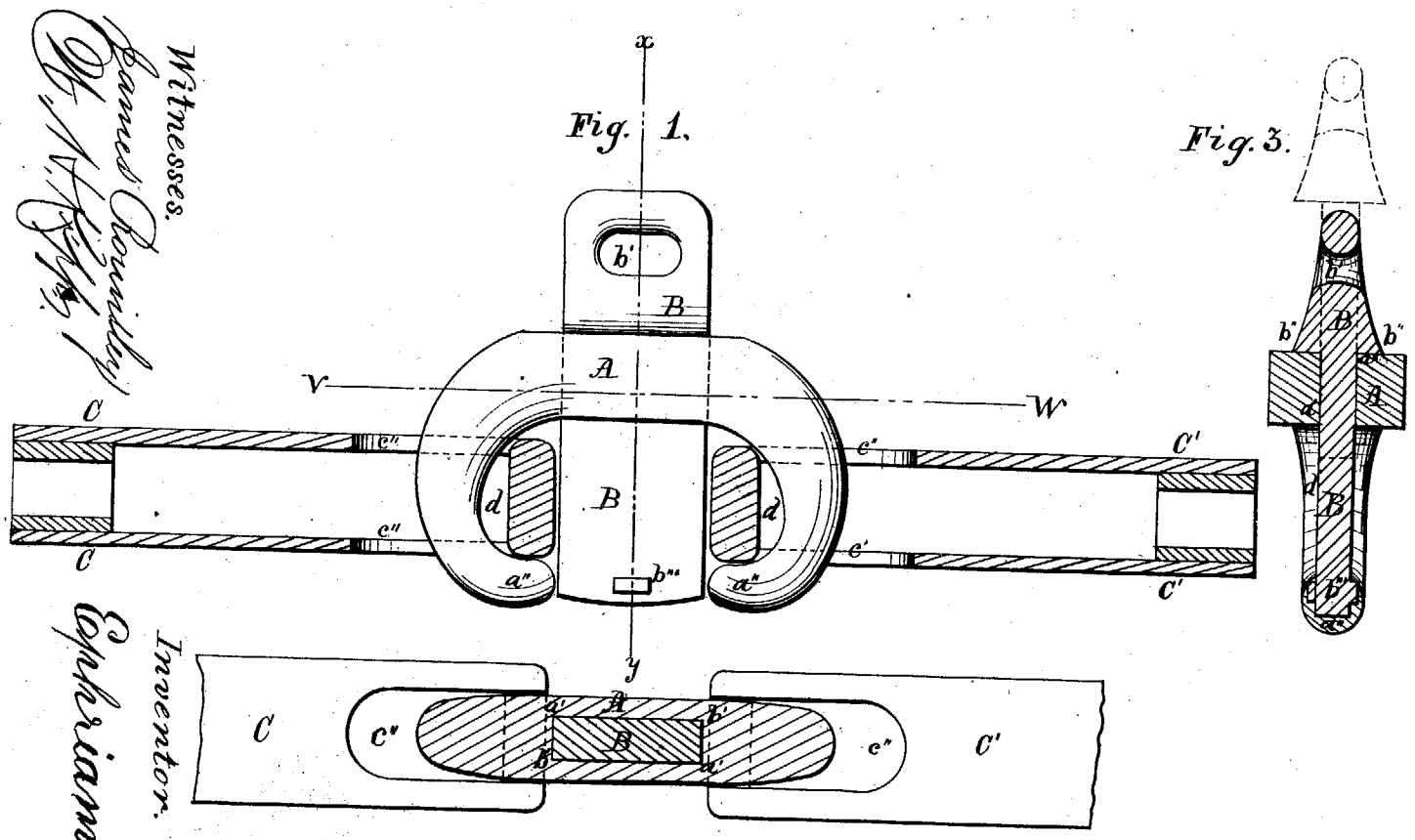
Witnesses.
James Rounsley
W. N. Kipp
Inventor.
Ephriam Russell
N. PETERS, PHOTO-LITHOGRAPHER, WASHINGTON, D. C.

UNITED STATES PATENT OFFICE.

EPHRIAM RUSSELL, OF MILLERSTOWN, PENNSYLVANIA, ASSIGNOR, BY MESNE ASSIGNMENTS, TO J. HIRAM MYERS, OF ROCHESTER, N. Y.

IMPROVEMENT IN CAR-COUPLINGS.

Specification forming part of Letters Patent No. 84,648, dated December 1, 1868; reissue No. 7,082, dated April 25, 1876; application filed May 19, 1875.

*To all whom it may concern:*

Be it known that I, EPHRIAM RUSSELL, formerly of Waynesburg, county of Chester, but now of Millerstown, in the county of Perry and State of Pennsylvania, did invent a new and useful Improvement in Couplings for Railroad-Cars, of which the following is a full, clear, and exact description, reference being had to the accompanying drawings, making a part of this specification, in which—

Figure 1 is a side view of the said coupling, as when applied to connect the usual draw-heads of two cars, showing the draw-heads in section; Fig. 2, a sectional plan view of the same, below the dotted line *v w*, of Fig. 1; and Fig. 3, a transverse section of the coupling detached, cut on the dotted line *x y* of Fig. 1.

Like letters of reference indicate the same parts wherever used.

The object of my invention is to afford a simply-constructed and safe coupling for railroad-cars, whereby the operator can connect or disconnect the cars with perfect facility and safety while standing on the platform of either car, and to afford a device to equalize and maintain a substantially uniform or regular distance between the draw-heads of two railroad-cars when coupled together.

My invention consists in the combination, with the link employed for coupling the draw-heads of cars, of a block or handle suspended or interposed between the draw-heads for preventing them from abutting against each other, and for holding them at a substantially uniform distance apart. It further consists in a novel construction of the link with its sliding block or handle, and of the draw-heads connected by said link whereby the attendant, standing upon the platform of either car, is enabled by means of said block or handle to readily apply or remove the link for connecting or disconnecting the cars, as hereinafter explained.

Referring to the drawings, A is the link, B the sliding block, and C C the respective draw-heads of two cars. The link A is intended to be made of iron sufficiently strong to sustain the usual strain. The block or handle B is made of suitable material having sufficient strength to resist the pressure or abutting of the draw-heads C C′, and that part of it which passes through the link A is made a little narrower in width than the breadth of the vertical oblong slot or open through-hole in the link A. The block B has a hand-hole *b′* through its upper or head end, and is provided with projecting shoulders *b″ b″*, by which it rests upon the upper side of the link A, while its lower end extends down between the draw-heads C C′. A stud, *b‴*, on each side of the lower end of the block B serves to prevent said block from being drawn entirely out of the link A.

The draw-heads may be made in the usual form, but, instead of the round hole heretofore required for a bolt-pin, an oblong slot, C″, is made down through each into which the ends of the link A drop simultaneously in applying the coupling, so that the lower end of the block B will drop down between the two draw-heads C C′. (See Fig. 1.)

In detaching the cars, the operator raises the block B, and thereby the link A, and thus removes the coupling.

In operation, the draw-heads C C′ are held together loosely by the link A, and at the same time kept from abutting together with each other by the block D, (a very important object,) which, at the same time, allows them sufficient freeness of motion for turning curves or irregularities in the rail-track, thus avoiding the excessive friction and abrasion of the ends of the draw-heads, and the violent contortions to which they are usually subject when the train is kept taut by the use of a short link alone, or when the opposite draw-heads are brought in contact by declining gradients.

The block B keeps the train steady, with the cars at regular distances apart, and free from slack in the couplings, thus permitting shorter and more uniform safety-brake connections, and, by thus avoiding the sudden jerks incident to slack couplings, accidents resulting from sudden application of the brakes and broken links are avoided; and the links, draw-heads, and connections may be made lighter, and therefore cheaper and less burdensome.

This is a very simple and reliable coupling for cars, and an effectual device to prevent the abutting of draw-heads, and can be applied and detached with facility and safety.

Having thus fully described my invention, what I claim as new, and desire to secure by Letters Patent, is—

1. The combination, with the link for connecting the draw-heads of cars, of a block, adapted to be interposed between said draw-heads, substantially as and for the purpose set forth.

2. The block B, provided with shoulders adapting it to rest upon and be supported by the coupling-link, intermediate between the draw-heads, substantially as described.

3. The slotted draw-heads in combination with the open coupling-link A, applied and operating substantially as described.

4. The combination, with the draw-heads, of the slotted link A and the interposed block or handle B, substantially as and for the purpose set forth.

EPHRIAM RUSSELL.

Witnesses:
SHUMAN MILLER,
LOUIE L. TERRY.